C. L. KENNEDY.
MOTOR GENERATOR SYSTEM.
APPLICATION FILED OCT. 23, 1916.
1,367,319.
Patented Feb. 1, 1921.
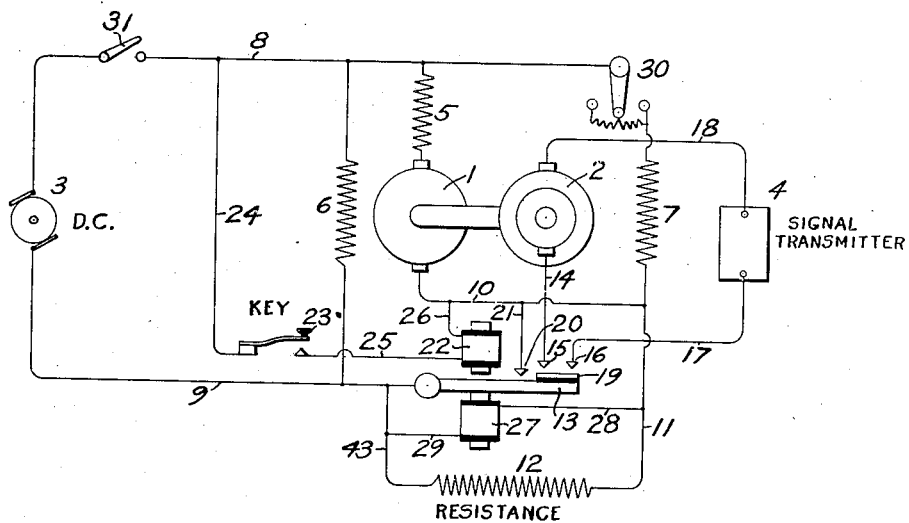

UNITED STATES PATENT OFFICE.

CARLTON L. KENNEDY, OF SOUTH BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS.

MOTOR-GENERATOR SYSTEM.

1,367,319.             Specification of Letters Patent.       Patented Feb. 1, 1921.

Application filed October 23, 1916. Serial No. 127,177.

*To all whom it may concern:*

Be it known that I, CARLTON L. KENNEDY, a citizen of the United States, residing at South Braintree, in the county of Norfolk and State of Massachusetts, have invented certain new and useful Improvements in Motor-Generator Systems; and I do hereby declare the following to be a full, clear, and exact description of the invention, such as will enable others skilled in the art to which it appertains to make and use the same.

This invention relates to means for controlling the starting of an electric motor. It is especially applicable to an electric system in which the motor constitutes an element of a motor-generator, and in which the motor is loaded and unloaded by the closing and opening of the generator-circuit. In its broadest aspects, however, the invention is not limited to use in this particular arrangement.

The object of the invention is to provide automatic means, of a simple and reliable character, for preventing the subjection of the motor, during the starting thereof, to an excessive flow of current. To this end a starting-resistance is provided, in connection with an automatic controlling-device which prevents the operator of the motor from cutting out the resistance so long as the current flowing in the motor exceeds a certain amount and the speed of the motor is substantially below normal. As a further means to the same end, an automatic device is provided for preventing the loading of the motor during the starting-operation, and in the specific form of the invention employed in connection with a motor-generator, this device is arranged to prevent closure of the load-circuit of the generator while the motor-speed is below normal and the current flowing in the motor is above a predetermined amount.

Other objects of the invention, and the means by which they are attained, will be set forth in connection with the following description of the preferred embodiment of the invention.

The accompanying drawing is a diagram of an electric system embodying the present invention.

The invention is illustrated as embodied in an electric system in which a motor-generator is employed as the source of alternating current for energizing a signal-transmitter of a pulsatory type, such, for example, as that used in sub-aqueous signaling. The motor-generator comprises a motor-armature 1 and a generator-armature 2, and the motor-armature is energized by direct current from any suitable source, such as the generator 3 shown in the diagram. The signal-transmitter 4 may be of any ordinary or suitable type, but in the present application of the invention it will be understood that this transmitter is employed in a system in which it is important that the periodicity of the electrical pulsations be closely regulated.

The field-windings of the motor may be arranged in any manner known to be suitable in such apparatus, and they are illustrated diagrammatically as comprising a series-winding 5 and a shunt-winding 6, while the generator is provided with the usual shunt field-winding 7. The current from the source 3 is conducted through leads 8 and 9, and from the lead 8 the current passes, through the series field-winding 5 and the motor-armature 1, to a wire 10 which is connected, through a wire 11, with a resistance-device 12. From this resistance-device the current returns, through a wire 43 and the lead 9, to the source of current.

The resistance-device 12 is employed both as a starting-resistance for the motor, to prevent an excessive flow of current in the motor when it is being started from a condition of rest, and as a regulating resistance, to counteract the tendency of the motor to change its speed of operation when loaded and unloaded by the opening and closing of the load-circuit of the generator.

In order that the resistance may be employed for these functions, means are provided for closing and opening a short-circuit around the resistance-device, so as to throw it out of and into effective operation as required. These means are illustrated, diagrammatically, as in the form of a pivoted relay-armature 13 coöperating with a series of fixed contacts. This armature constitutes a circuit-closer by which the load-circuit of the generator and the short-circuit around the resistance-device may be closed simultaneously. A wire 14, connected with one of the generator-brushes, extends to a fixed contact 15, and a second fixed contact 16 is connected, by a wire 17, with the signal-transmitter, while the current returns from the latter to another brush of the generator, through the wire 18. A contact-plate 19 is carried by, but insulated from, the relay-armature, and when the armature is raised this plate engages the contacts 15 and 16 and closes the load-circuit. At the same time the armature closes the short-circuit above referred to. This is accomplished by the engagement of the armature with a fixed contact 20, which is connected with the wire 10 by a wire 21. When this engagement occurs the current returning from the motor-armature flows through the wires 10 and 21, and through the contact 20 and the armature 13, and thence through the lead 9, which is connected with the armature back to the source 3. A path of low resistance is thus provided, which renders the resistance-device 12 ineffective.

The armature 13 is actuated by an electromagnet 22 controlled by a key 23. This key constitutes the transmitting-key by which the signal-transmitter is controlled. When the key is closed current flows, from the lead 8, through the wire 24 to the key, and from the key through a wire 25 to the magnet 22. From the magnet, the current returns, through a wire 26, to the wire 10 and thence, through the wire 11, the resistance-device 12, and the wires 43 and 9 back to the source 3.

During the normal operation of the apparatus the closing of the key 23 at once results in the lifting of the relay-armature, so that simultaneously the load-circuit of the generator is closed and the resistance device 12 is short-circuited. This resistance-device is so proportioned as to compensate approximately for the load imposed upon the motor-generator. Accordingly, the current flowing through the armature of the generator is augmented sufficiently to meet the load, and thus is prevented the momentary drop in the speed of the motor-generator which would otherwise occur.

The apparatus as so far described is adapted only for operation at the normal speed of the motor-generator, and the present invention resides particularly in the employment of additional apparatus which will now be described. A switch 31 is shown as interposed in the lead 8, this switch being that which is employed for the purpose of disconnecting the motor-generator from the source of current when its operation is not required. When the motor-generator is at rest, if the switch 31 be closed to start the motor, an excessive current tends to flow through the motor, owing to the absence of counter electromotive force therein. At this time, however, the resistance-device 12 is in circuit with the motor, so that it acts as a starting-resistance and prevents an undue flow of current while the motor-generator is rising to its normal speed. If, however, the operator were accidentally or carelessly to close the key 23 during this starting-operation, and the armature 13 were to be raised, thus short-circuiting the resistance-device 12, the protection afforded to the motor by the resistance-device would thus be withdrawn. In accordance with the present invention this action is automatically prevented, and as the preferred means for this purpose a second electromagnet 27 is shown, this magnet being arranged to oppose the magnet 22, that is to say, it tends to hold the relay-armature in its depressed position. The magnet 27 is connected, by a wire 28, with the wire 11, and by a wire 29 with the wire 43, so that the magnet is connected in parallel with the resistance-device and in series with the motor.

When the motor is starting, and is still running substantially below normal speed, there is a comparatively heavy current through the motor, and the difference in potential between the terminals of the resistance-device 12 is comparatively great, and the magnet 27 is strongly energized. At the same time the energization of the magnet 22 is comparatively weak, owing to the fact that this magnet is in parallel with the motor and in series with the resistance-device and the magnet 27. Accordingly, at this time the magnet 22 in incapable of overcoming the opposition of the magnet 27 and raising the relay-armature, and thus the resistance-device is maintained in effective operation notwithstanding the depression of the key 23. When the motor-speed has approximately reached its normal rate, however, thus increasing the counter E. M. F. of the motor and reducing the flow of current in the motor, the flow through the magnet 27 is reduced, while the flow through the magnet 22 is increased, and the latter magnet will then act to raise the armature 13 if the key 23 is closed, in accordance with the normal operation of the apparatus.

The magnet 27, by opposing the action of the magnet 22 during the starting-operation, not only prevents the short-circuiting of the resistance-device 12, but also prevents the closing of the load-circuit of the generator. It thus affords a further protection to the motor during the starting-operation, since it insures that the rapid rise of the motor-speed to normal shall not be impeded by the imposition of a load on the motor. In the case of a comparatively small motor this form of protection alone may be sufficient, since an unloaded motor, even when subjected to the full E. M. F. by which it is normally operated, may attain normal speed, and thus cut down the flow of current in the motor, with sufficient promptness to prevent injury to the motor from the momentarily excessive current.

While the circuit closer comprising the armature 13 is shown and described as in the form of a relay controlled indirectly by the key 23, it will be apparent that this arrangement is not an essential feature of the invention. It will also be apparent that the two electromagnetic windings which oppose each other in controlling the relay-armature need not be arranged upon independent magnetic cores, but may be arranged in other well-known ways to oppose each other in their effect upon the armature.

The winding of the magnet 27, being normally in series with the motor, but being short-circuited when the relay-armature 13 rises, acts in the same manner as the resistance-device 12 to regulate the flow of current in the motor. Accordingly, it may be possible in some arrangements to omit the resistance-device 12 and employ the magnet-winding to perform the functions performed by this resistance.

The field-winding 7 of the generator is shown as connected with the current-lead 8 through a rheostat 30, by which the strength of the field may be adjusted to regulate the output of the generator. The return from the field-winding 7 is either through the resistance-device 12 or through the short-circuit provided by the relay-armature, and accordingly the flow of current through this winding is automatically augmented to a slight degree when the transmitting-key 23 is closed. This arrangement has been found to contribute to uniformity in the operation of the generator.

The invention is not limited to the embodiment thereof hereinbefore described and illustrated in the accompanying drawing, but may be embodied in various other forms within the scope of the following claims.

The invention claimed is:—

1. An electric system having, in combination, a motor; means for loading and unloading the motor; and means for automatically preventing the application of the load to the motor while it is running below a predetermined speed.

2. An electric system having, in combination, a motor; means for loading and unloading the motor; and means for automatically preventing the application of the load to the motor while the current-flow in the motor is above a predetermined amount.

3. An electric system having, in combination, a motor-generator; a load-circuit connected with the generator; means for closing the load-circuit; and means for automatically preventing the operation of said means when the motor is running substantially below a predetermined speed.

4. An electric system having, in combination, a motor-generator; a load-circuit connected with the generator; means for closing the load-circuit; and means for automatically preventing the operation of said means when the current-flow through the motor exceeds a predetermined amount.

5. An electric system having, in combination, an electric motor-generator; a load-circuit connected with the generator; a circuit-closer controlling the load-circuit; and an an electromagnetic device, energized by the current flowing in the motor, for preventing the operation of the circuit-closer when said current exceeds a predetermined amount.

6. An electric system having, in combination, an electric motor-generator; a load-circuit connected with the generator; a resistance-device; means for connecting the motor with a source of electricity, in circuit with the resistance-device; short-circuit connections around the resistance-device; a circuit-closer arranged to close, simultaneously, the load-circuit and said short-circuit; and an electromagnetic device, connected across the terminals of the resistance-device for preventing operation of the circuit-closer.

7. An electric system having, in combination, a motor having a predetermined normal speed of operation; means for loading and unloading the motor; and automatic means responsive to the operating conditions of said motor for permitting said means to load said motor only when said motor operates at said normal speed.

8. An electric system having, in combination, a motor-generator having a predetermined normal speed of operation, and means dependent upon the operating conditions of said motor for closing a load-circuit upon the generator only when said motor operates at said normal speed.

9. An electric system having, in combination, a motor-generator, means for starting the motor and bringing it up to normal speed; means for closing a load-circuit upon the generator; and automatic means for preventing the operation of said last means during the starting operation of the motor.

10. An electric system having, in combination, a motor-generator; a starting and regulating resistance in circuit with the motor, means for excluding said resistance from circuit; means for closing a load-circuit on the generator, and means for preventing the operation of both of said means when the motor current exceeds a predetermined value.

11. An electric system having, in combination, a motor-generator; a speed-regulating resistance in circuit with the motor; a load circuit; means for concurrently closing said load-circuit upon the generator and excluding said resistance from the motor circuit, whereby the speed of the motor-generator is maintained constant; and means coöperating with said last means and responsive to operating conditions of said motor for preventing the operation of said last means during the starting operation of the motor.

12. An electric system having, in combination, an electric motor-generator; a load-circuit; a circuit-closer for connecting said load circuit to the generator, and an electromagnetic device for operating said circuit-closer only when the motor is running at normal speed, said device comprising opposing windings respectively responsive to the counter-electro-motive force of the motor and to the armature current thereof.

13. An electric system having, in combination, a motor, a motor circuit, a speed regulating resistance in the motor armature circuit, means for loading the motor, and means for excluding the speed regulating resistance from the motor armature circuit concurrently with the application of the load to the motor whereby a drop in the motor speed on application of the load is prevented.

14. An electric system having, in combination, a motor, a motor circuit, a speed regulating resistance in the motor armature circuit, means for loading the motor, and means for automatically excluding the speed regulating resistance from the motor armature circuit concurrently with the application of the load to the motor whereby a drop in the motor speed on application of the load is prevented.

15. An electric system having, in combination, a motor generator, a motor circuit, a speed regulating resistance in the motor armature circuit, means for applying a load to the generator, and means for excluding the resistance from the motor armature circuit concurrently with the application of the load to the generator whereby a drop in the motor speed on application of the load is prevented.

16. An electric system having, in combination, a motor generator, a motor circuit, a speed regulating resistance in the motor armature circuit, means for concurrently applying a load to the generator and for excluding the resistance from the motor armature circuit whereby a drop in the motor speed on application of the load is prevented.

17. An electric system having, in combination, a motor generator, a motor circuit, a speed regulating resistance in the motor armature circuit, a load circuit for the generator and a circuit closer for connecting said load circuit to the generator, said circuit closer having provision for excluding the speed regulating resistance from the motor armature circuit concurrently with the application of the load to the generator whereby a drop in the motor speed on application of the load is prevented.

18. An electric system having, in combination, a motor, a motor circuit, a speed regulating resistance in the motor circuit, means for loading the motor, means for excluding the speed regulating resistance from the motor circuit concurrently with the application of the load to the motor whereby the motor speed is maintained constant, and means responsive to the operating conditions of the motor for preventing the operation of the said last means during the starting of the motor.

CARLTON L. KENNEDY.